US010022914B2

(12) United States Patent
Hemani et al.

(10) Patent No.: US 10,022,914 B2
(45) Date of Patent: Jul. 17, 2018

(54) METHOD AND APPARATUS FOR AUTOMATICALLY ADDING UTILITY HOLES TO PRINTABLE 3-DIMENSIONAL MODELS

(71) Applicant: Adobe Systems Incorporated, San Jose, CA (US)

(72) Inventors: Mayur Hemani, New Delhi (IN); Naveen Prakash Goel, Noida (IN); Abhishek Kumar, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 657 days.

(21) Appl. No.: 14/077,900

(22) Filed: Nov. 12, 2013

(65) Prior Publication Data

US 2015/0134095 A1     May 14, 2015

(51) Int. Cl.
| | |
|---|---|
| *G06F 19/00* | (2018.01) |
| *B29C 67/00* | (2017.01) |
| *B33Y 50/02* | (2015.01) |
| *G06T 19/00* | (2011.01) |
| *B29C 64/386* | (2017.01) |

(52) U.S. Cl.
CPC ........ *B29C 67/0088* (2013.01); *B29C 64/386* (2017.08); *B33Y 50/02* (2014.12); *G06T 19/00* (2013.01)

(58) Field of Classification Search
USPC ................................................ 700/98; 703/1
See application file for complete search history.

(56) References Cited

U.S. PATENT DOCUMENTS

| | | | | |
|---|---|---|---|---|
| 2011/0087350 | A1* | 4/2011 | Fogel ................. | G06F 17/50 700/98 |
| 2012/0224755 | A1* | 9/2012 | Wu ..................... | G06T 17/00 382/131 |
| 2012/0290272 | A1* | 11/2012 | Bryan ................. | A61B 17/1684 703/1 |
| 2013/0124151 | A1* | 5/2013 | Mech .................. | G06F 17/50 703/1 |
| 2014/0244018 | A1* | 8/2014 | Bach ................... | A63H 33/08 700/103 |
| 2015/0165690 | A1* | 6/2015 | Tow .................... | B33Y 80/00 700/119 |

* cited by examiner

*Primary Examiner* — Mohammad Ali
*Assistant Examiner* — Md Azad
(74) *Attorney, Agent, or Firm* — Keller Jolley Preece

(57) ABSTRACT

A computer implemented method and apparatus for automatically adding utility holes to printable 3D models by accessing a digital representation of a 3D model; accessing specifications that define the geometry of a utility hole to be included with the 3D model; performing a heuristic evaluation of the digital representation of the 3D model to determine one of one or more possible placements of the utility hole to be included with the 3D model as a placement for the utility hole; modifying the digital representation of the 3D model so as to include the utility hole at the placement; and providing a modified digital representation of the 3D model for printing.

20 Claims, 9 Drawing Sheets

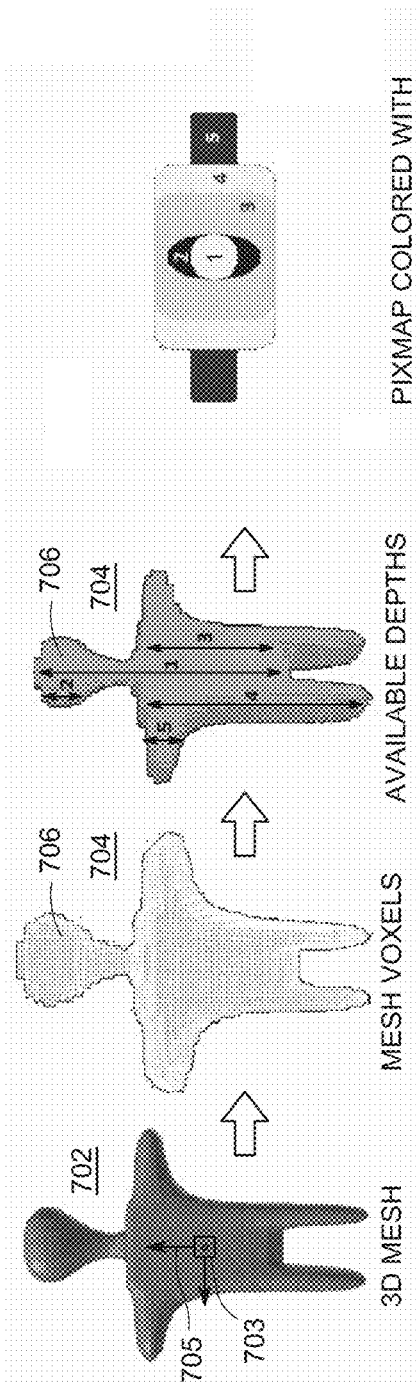
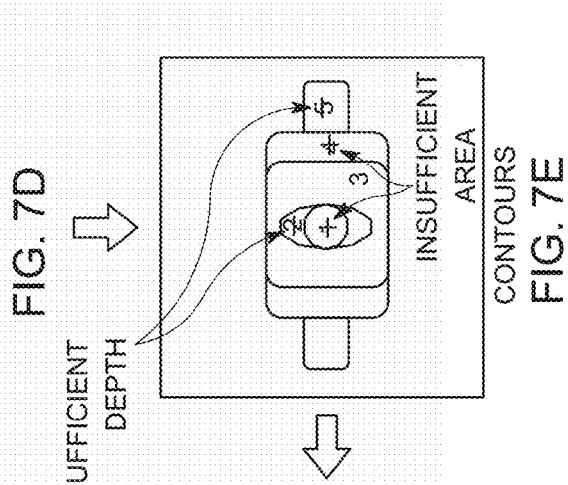
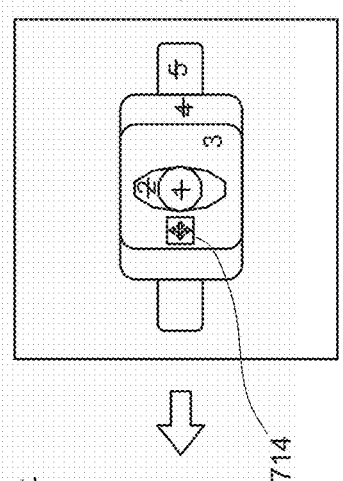
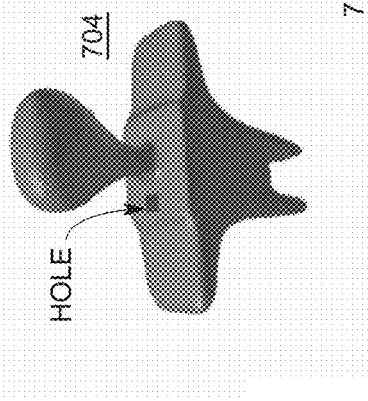
FIG. 7A 3D MESH
FIG. 7B MESH VOXELS
FIG. 7C AVAILABLE DEPTHS OF VOXELS IN DIFFERENT REGIONS
FIG. 7D PIXMAP COLORED WITH SHADES OF GRAY TO REPRESENT AVAILABLE DEPTH
FIG. 7E CONTOURS
FIG. 7F HOLE PLACEMENT
FIG. 7G

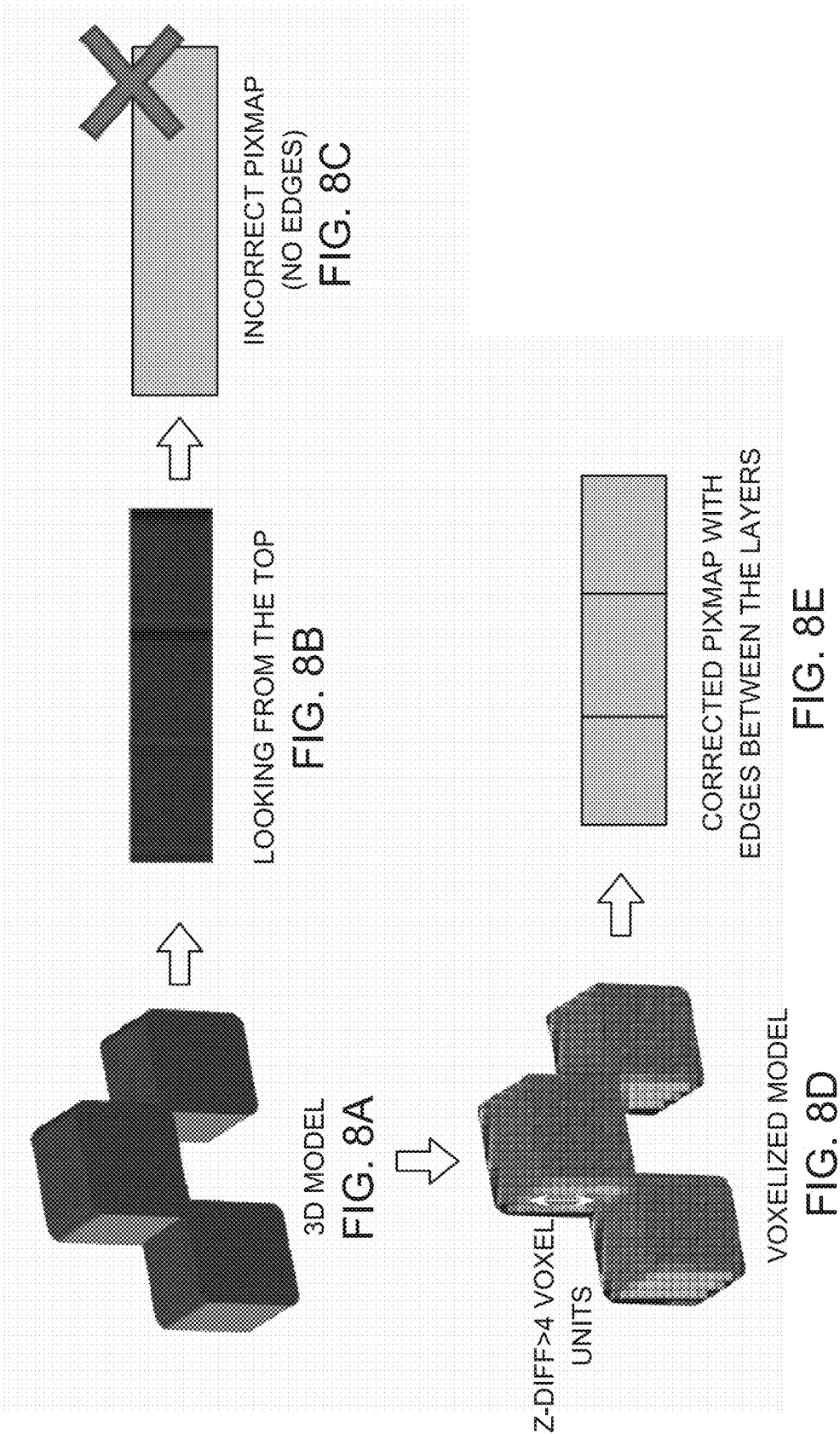

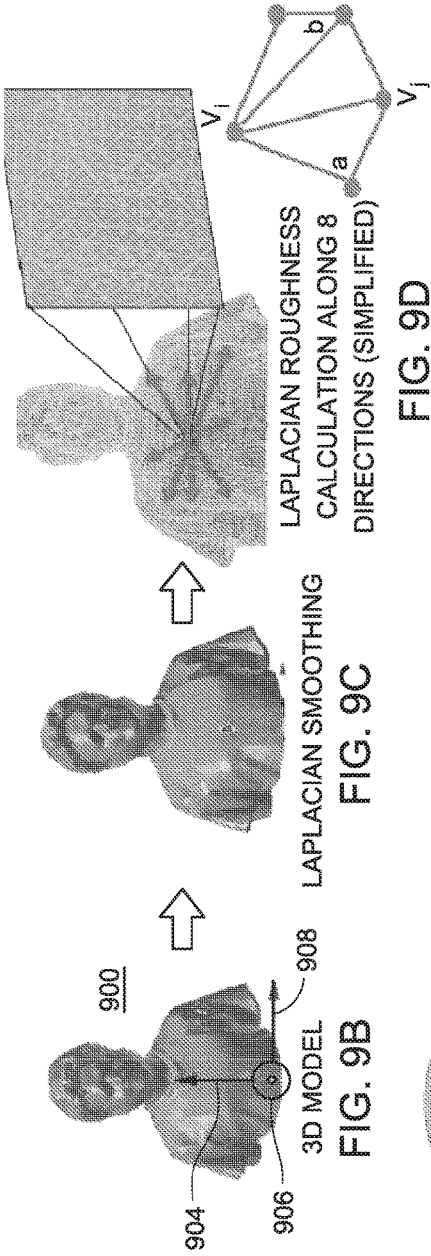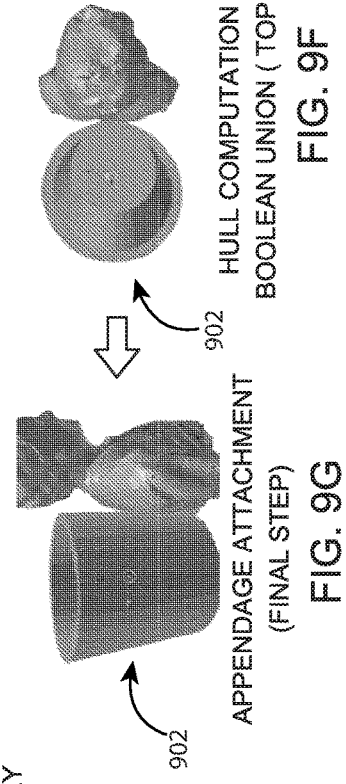
FIG. 9B 3D MODEL
FIG. 9C LAPLACIAN SMOOTHING
FIG. 9D LAPLACIAN ROUGHNESS CALCULATION ALONG 8 DIRECTIONS (SIMPLIFIED)
$$Lapl(v_i) = \sum_{v_j \in Neighbours(v_i)} (w_{ij})(v_i - v_j)$$
$$\text{where } w_{ij} = \cot(a) + \cot(b)$$
FIG. 9E
FIG. 9A HOLE GEOMETRY
FIG. 9F HULL COMPUTATION AND BOOLEAN UNION (TOP VIEW)
FIG. 9G APPENDAGE ATTACHMENT (FINAL STEP)

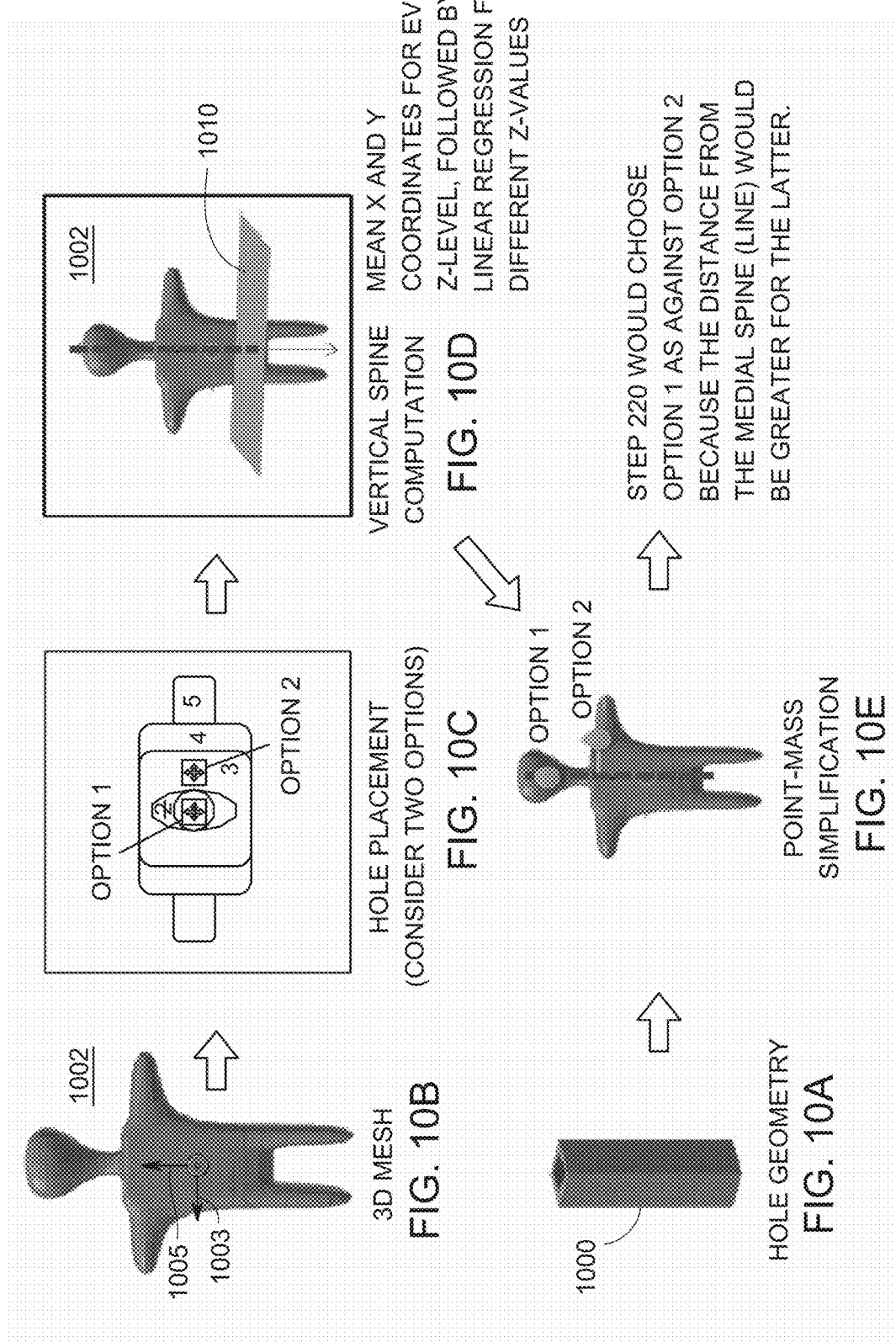

METHOD AND APPARATUS FOR AUTOMATICALLY ADDING UTILITY HOLES TO PRINTABLE 3-DIMENSIONAL MODELS

BACKGROUND

Field of the Invention

Embodiments of the present invention generally relate to 3-dimensional (3D) printing and, more particularly, to a method and apparatus for automatically adding utility holes to printable 3D models.

Description of the Related Art

With the increasing popularity of 3D printers, either for home printing use or via a remote service, and the availability of many artistic 3D models for printing, it is likely that the printing of 3D models will greatly increase. Such users may also like to obtain some functional utility from the model they select to print, along with the intrinsic artistry of the 3D model. One example of such a utility would be as an object holder. For example, a user may desire to use an artistic 3D model as a pen-holder. However, modifying a 3D model to add functional utility is a tedious, time consuming and manual task.

Therefore, there is a need for a method and apparatus for automatically adding utility holes to printable 3D models.

SUMMARY

A method for automatically adding utility holes to printable 3D models is described. The method accesses a digital representation of a 3D model, accesses specifications that define the geometry of a utility hole to be included with the 3D model and then performs a heuristic evaluation of the digital representation to determine a placement for the utility hole. The digital representation of the 3D model is then modified so as to include the utility hole at the placement and the modified digital representation of the 3D model is provided for printing.

In another embodiment an apparatus for automatically adding a utility hole to a printable 3-dimensional model includes a computer having a heuristic evaluation module for heuristically evaluating a digital representation of a 3D model to determine a placement for a utility hole to be included with the 3D mode. A model modification module of the computer modifies the digital representation of the 3D model so as to include the utility hole at the placement and provides a modified digital representation of the 3D model for printing.

These and other features and advantages of the present disclosure may be appreciated from a review of the following detailed description of the present disclosure, along with the accompanying figures in which like reference numerals refer to like parts throughout.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 7A, 7B, 7C, 7D, 7E, 7F and 7G are image representations useful for understanding the method of FIGS. 2 and 3, according to one or more embodiments;

FIGS. 8A, 8B, 8C, 8D and 8E are image representations useful for understanding a portion of the method of FIGS. 2 and 3, according to one or more embodiments;

FIGS. 9A, 9B, 9C, 9D, 9E, 9F and 9G are image representations useful for understanding the method of FIG. 4, according to one or more embodiments; and FIGS. 10A, 10B, 10C, 10D and 10E are image representations useful for understanding the method of FIGS. 2 and 3, according to one or more embodiments.

Figure 1:
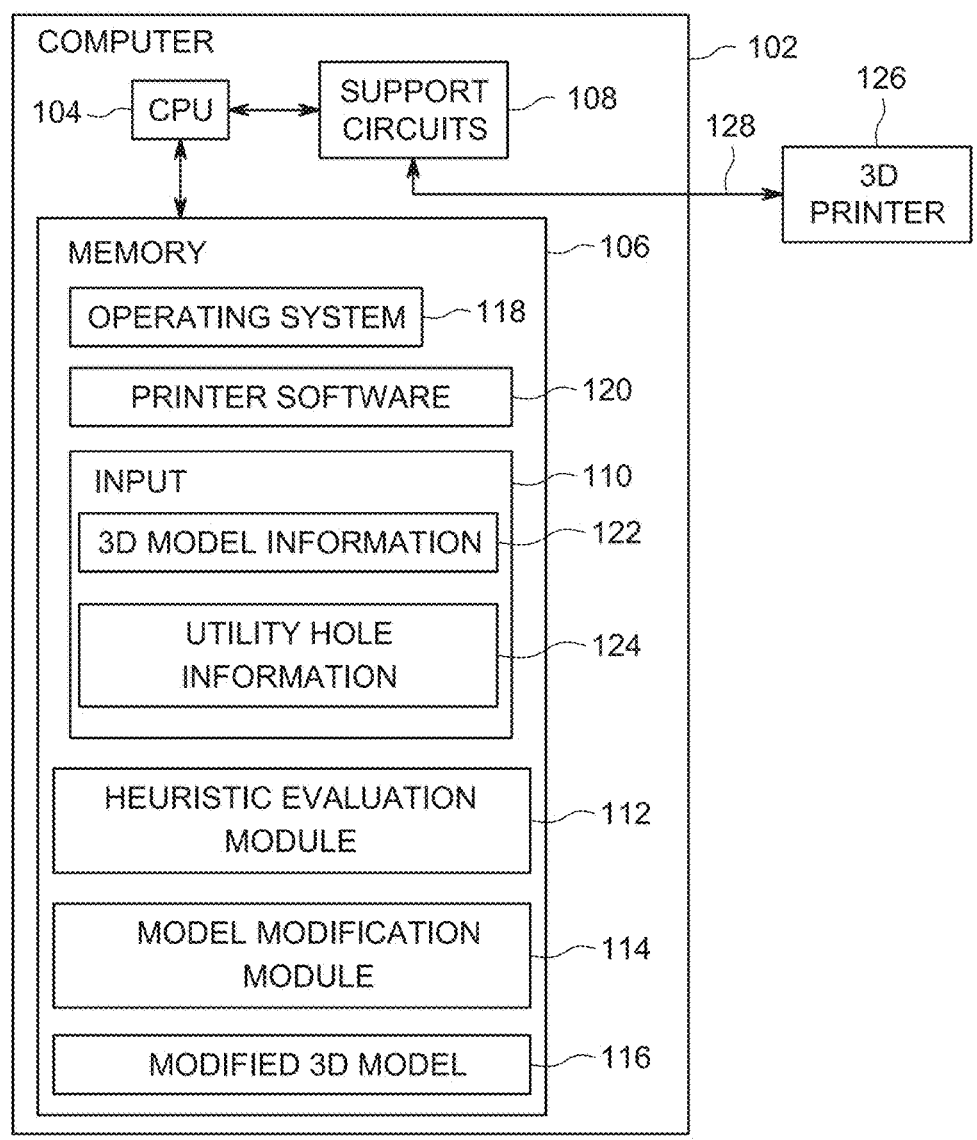
FIG. 1 is a block diagram of an apparatus for automatically adding utility holes to printable 3D models, according to one or more embodiments.

While the method and apparatus is described herein by way of example for several embodiments and illustrative drawings, those skilled in the art will recognize that the method and apparatus for automatically adding utility holes to printable 3D models is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automatically adding utility holes to printable 3D models defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for automatically adding utility holes to printable 3D models, so as to enable use of the model as an object holder. Based on input of the 3D model and parameters defining the geometry of the utility hole, the embodiments perform a heuristic evaluation to determine one of one or more possible placements of the utility hole to be included with the 3D model as a most suitable placement for the utility hole. The digital representation of the 3D model is then modified so as to include the utility hole at the placement determined to be most suitable; and the modified digital representation of the 3D model is provided for printing. The embodiments use one of an additive or subtractive method as determined by the heuristic evaluation based on the input parameters that define the geometry of the utility hole. The subtractive method includes removing a portion of the 3D model thereby creating a utility hole. The additive method includes adding onto the 3D model an appendage that includes the utility hole, at a suitable location, such as one that is structurally stable and least likely to affect the aesthetics of the 3D model.

If the evaluation finds that one of either the additive or subtractive methods is not suitable for determining a location for the utility hole, the other of the additive and subtractive method is evaluated for suitability. The model is then modified so as to include the utility hole to be formed with the most suitable method in the most suitable location.

Suitability is determined by heuristics that try to minimize disturbing effects of an added hole on the surface details that define the appearance of the model (e.g., its aesthetics, as viewed from a given point of view). Optionally other effects on the 3D model may be used to determine suitability, such as disturbance of the center of gravity when the utility hole is added for the purpose to hold an expected object. A heuristic evaluation is a usability inspection method that helps to identify usability problems. The heuristic evaluation specifically involves evaluation based on compliance with recognized usability principles (the "heuristics"). Thus, as noted above, if the initial evaluation input by a user comprises a subtractive method whereby a portion of the 3D model is removed, if that evaluation determines that the subtractive method is not suitable for use, an additive method is evaluated wherein an appendage that includes the hole is attached to the model. The suitability evaluation performed by each method attempts to minimize detrimental changes to the artistic/aesthetic appearance of the model caused by including the utility hole with the model.

It is noted that the suitability evaluations described below are representative of several preferred suitability evaluation techniques. However, as those skilled in the art realize, such examples should not be considered as limiting examples, an many other types of suitability evaluations are possible with the addition of minimal effort.

Advantageously, the embodiments described herein can be employed to allow a user having no specific image or model processing skills to quickly personalize a 3D model for printing so as to include a utility hole, while minimizing the effect of the utility hole creation process on the aesthetics of the 3D model. It is noted that the utility provided by the hole can be quite varied. For example, the hole could be formed with threads along its inner walls, enabling the hole to function as a "holder" or receiver for a threaded member (e.g., a bolt), thereby providing a further utility for the hole as a means for connecting or securing the 3D model to an additional object using the threaded member or for securing an additional object to the 3D model using the threaded member.

Various embodiments of a method and apparatus for automatically adding utility holes to printable 3D models are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for automatically adding utility holes to printable 3D models, according to one or more embodiments. The apparatus 100 includes a computer 102 coupled to a three-dimensional (3D) printer 126 via a connection 128. The computer 102 is a computing device, such as a desktop computer, laptop, tablet computer, and the like. The computer 102 includes a Central Processing Unit (CPU) 104, a memory 106 and support circuits 108. The CPU 104 may include one or more commercially available microprocessors or microcontrollers that facilitate data processing and storage. The various support circuits 108 facilitate the operation of the CPU 104 and include one or more clock circuits, power supplies, cache, input/output circuits, and the like. The memory 106 includes at least one of Read Only Memory (ROM), Random Access Memory (RAM), disk drive storage, optical storage, removable storage and/or the like. The connection 128 may comprise a wire, cable, fiber optic and/or wireless link facilitated by various types of well-known network elements, such as hubs, switches, routers, and the like, so as to form a data transfer connection between the support circuits 108 of the computer 102 and the 3D printer 126. Thus, the 3D printer 126 may be directly connected to the computer 102 or may be connected as a networked device, or even as a remote service to the user of the computer 102.

The memory 106 includes printer software 120, an input 110, a heuristic evaluation module 112 for determining suitability of subtractive hole creation using one or both of a subtractive or additive method, a model modification module 114 for modifying an input 3D model in accordance with instructions from the heuristic evaluation module 112, a modified model 116, and an operating system 118. The operating system 118 may include various commercially known operating systems that enable operation of standard functions typically performed by computer 102. Printer software 120 is computer software sufficient to operate 3D printer 126, and is typically included by the vendor of the 3D printer 126 with each vended 3D printer. Alternatively, the vendor may make such software available online for retrieval and use by a purchaser of the printer, or provide such software for use online as a service. Printer software 120 may be a software plug-in or extension to existing printer software or an Application Programming Interface (API) for a 3D printer. Some printers, such as Rep-rap 3D printers (which are essentially Fused Deposition Modeling devices), do not require vendor supplied software applications for operation, and can instead be operated by open-source printing software applications such as Skeinforge or Pronterfac. In accordance with embodiments of the invention, irrespective of where or how printer software is made available to receive the input 110, the printer software 120 supplies digital signals to 3D printer 126 so it will print the modified 3D model 116 with a newly created utility hole.

Input 110 includes input by a user of the computer 102 of 3D model information 122. The 3D model information 122 includes a digital data file representative of a 3D model to be printed. A standard data interface format between CAD (computer aided design) software that creates 3D models and 3D printers is typically a tessellated mesh file format that approximates the shape of the 3D model using triangular facets, such as the STereoLithography (STL) or Additive Manufacturing File (AMF) file format. The input 110 also includes utility hole information 124, wherein the utility hole information 124 includes hole dimensions (such as the diameter and depth or height, width and depth) and orientation (such as the axis orientation) desired by the user to be included in the 3D model so as to cause the model to have utility as an object holder.

The heuristic evaluation module 112 evaluates the 3D model information 122 in conjunction with the utility hole information 124 to determine the suitability of the model to include the utility hole via one of either a subtractive or an additive hole creation method, as well as a most suitable location for the hole. In some embodiments the input 110 may specify a preferred method for the utility hole creation, and in other embodiments the user does not input a preferred method and the heuristic evaluation module 112 determines which hole creation method is more suitable, as well as a suitable location for the utility hole. Upon determination of a suitable location to create the utility hole, the model modification module 114 modifies the 3D model information 122 representative of the 3D model, and stores the modified file as a modified 3D model 116. The printer software 120 accesses the modified 3D model 116 and operates in conjunction with the CPU 104 to create appropriate signals that are applied to the 3D printer 126, via the connection 128, so as to create from the modified 3D model 116 an object holder as desired by the user. It is noted that FIG. 5 and FIG. 6, described in detail below, respectively illustrate creating a utility hole in a 3D model using a subtractive and an additive method.

Figure 2:
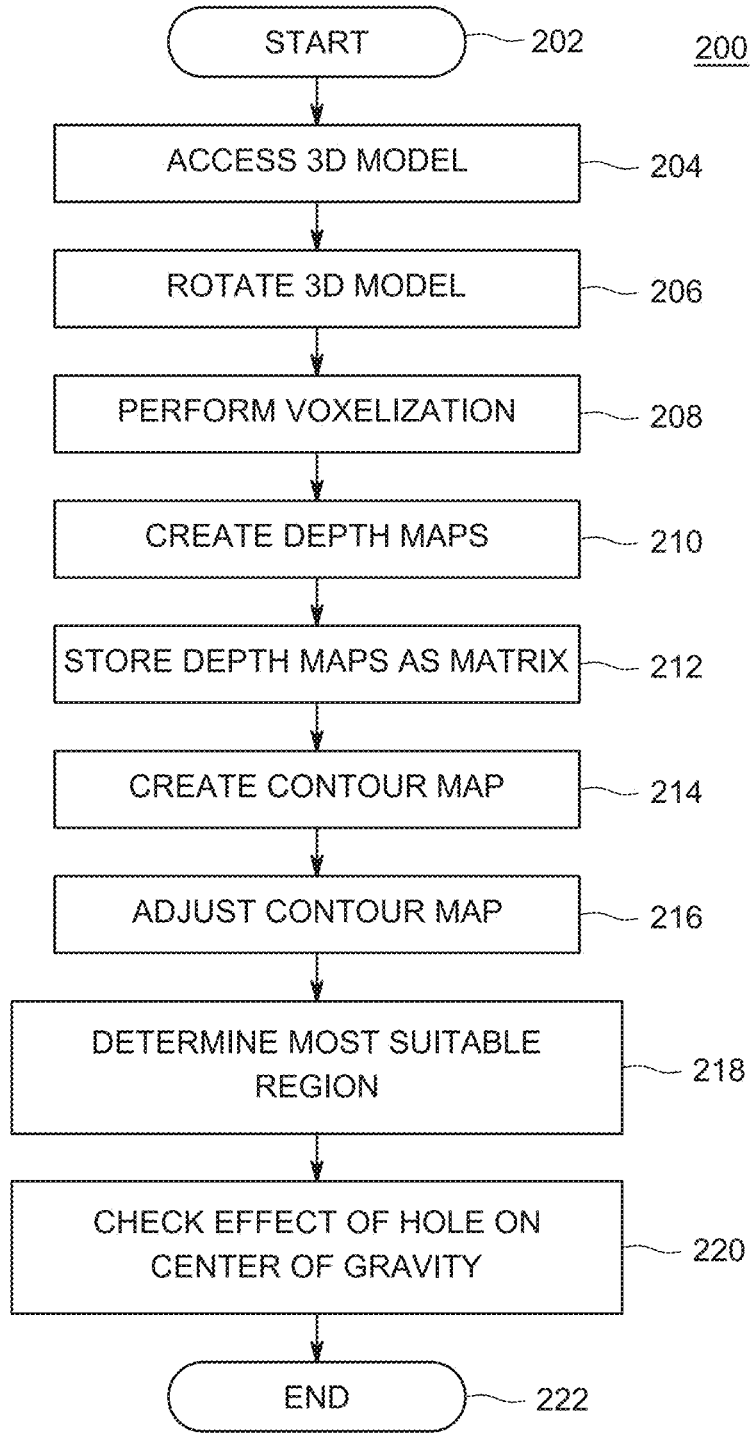
FIG. 2 depicts a flow diagram of a subtractive method for automatically adding utility holes to printable 3D models as performed by the heuristic evaluation module of FIG. 1, according to one or more embodiments.

FIG. 2 is a flow diagram of a subtractive method 200 for automatically adding utility holes to printable 3D models, as performed by the heuristic evaluation module 112 of FIG. 1, according to one or more embodiments. This method is used either when the user specifies use of the subtractive method, or in other embodiments, when the heuristic evaluation module 112 of FIG. 1 determines that a subtractive method is the most suitable hole creation method given the user inputs. FIGS. 7A through 7G are image representations useful for understanding method 200, and are therefore referred to in the following description of method 200.

A user desiring to add a utility hole to a 3D model opens a file containing the 3D model using printer software 120 or provides an input to enable the printer software 120 to access the file containing the 3D model. The 3D model may be accessed from user's hard drive or any other resource. After opening the 3D model file, the user specifies dimensions for a utility hole to be created in or on the 3D model and a desired orientation axis. The user interfaces with the computer 102 using a standard user interface such as a display, keyboard and mouse (not shown).

Accordingly, the user may indicate to the computer 102 where to access the 3D model information 122 by connecting, via support circuits 108, a memory stick (not shown) having the 3D model information 122 stored therein, to the computer 102. Alternatively, the user may indicate to computer 102 that the 3D model information 122 can be accessed at a given Universal Resource Location (URL). The user will also indicate to printer software 120 a location for a desired utility hole and a desired orientation. In accordance with embodiments of the invention, the printer software 120 will determine where to place the utility hole, create a modified 3D model, and provide the modified model to the printer 126 for printing the modified 3D model with the user desired utility hole.

The method starts at step 202 and proceeds to step 204. At step 204, the method 200 accesses a 3D model 702 of FIG. 7A for which a user desires to add a utility hole for holding an object. In some embodiments, step 204 also accesses a user specified location for the utility hole having a size in which to contain the object, as well as a desired axis for orientation of the utility hole. The surface of the 3D model is typically defined as a continuous geometric representation of polygons (such as triangular plates) using one of the well-known and standard tessellated mesh file formats, such as the STereoLithography (STL) or Additive Manufacturing File (AMF) file formats. FIG. 7A is illustrative of a mesh file format representative of a 3D model 702, having a user specified cross-section 703 for the utility hole and a desired axial orientation 705 for the utility hole. A desired depth for the utility hole along the axis 705 is also specified by the user.

The method 200 proceeds to step 206. At step 206, the method 200 rotates the 3D model so as to align the longitudinal axis of the model with the user desired axis for utility hole orientation. The method 200 proceeds to step 208, where the method 200 converts the 3D model from the tessellated mesh surface representation into a volumetric representation 704 shown in FIG. 7B. Such conversion is useful because although polygons are able to efficiently represent 3D structures having empty or homogeneously filled space, for 3D printing, volumetric representation is preferred since a grid of voxels can more easily represent regularly sampled spaces that are non-homogeneously filled. A voxel is a volume element representing a value on a regular grid in three-dimensional space. As well known, voxelization converts geometric objects from their continuous geometric surface representation (such as a tessellated mesh file format), to a set of voxels in a 3D grid (e.g., x, y, z) that best approximates the shape of the continuous geometric representation. Accordingly, at step 208, mesh representation of 3D model 702 of the 3D model is converted, using any one of many well-known voxelization algorithms, into a voxel grid representation 704 composed of many individual voxels 706, as shown in FIG. 7B.

The method 200 proceeds to step 210, where a depth map is created. The depth map represents how many solid voxels are continuously adjacent and below a given voxel in a given x-y planar portion (i.e., a 2-dimensional, 2D, layer) of the 3D model. A plurality of x-y planes of the depth map are referred to herein as a pixel map. For example, a top layer is defined as an x-y plane of pixels representative of voxels at a given z depth near a top portion of the 3D model. FIG. 7C illustrates the 3D model 704 of having a first top layer at the top of the head (having a z depth of 0), and a second top layer at the top of the shoulders (having a z depth of 0 less the z position of the voxel defining the top of the shoulder). For each voxel on a top layer, a value is determined based on the number of adjacent voxels that lie in a continuous and straight line directly below that voxel. Those top layer voxels having a similar depth value are grouped into a common area.

The method 200 proceeds to step 212, where the method 200 stores these depth counts in a matrix with depth count entries for the entire x-y width and z height of the 3D model. Such matrix is referred to herein as a pixel-map. As noted above, FIG. 7D illustrates a top view of such a pixel-map that is stored by step 212. More specifically, since the common depth areas shown in FIG. 7C have a similar count of the voxels in the z-axis direction for a particular x and y value of a top layer, in FIG. 7D the count of each area is used as a gray-value associated with that top-layer of voxels, such that the gray-value of that voxel indicates the continuously available voxels in the z (depth) direction from which it may be possible to form the utility hole. So for example, if there are N continuously adjacent voxels below a top-level voxel before hitting a gap in the voxel grid representation of the 3D model, such as illustrated by the lines in FIG. 7C, and the height (z-axis depth) of the model is H voxels, then an 8-bit gray-value representative of the depth below this voxel at the top-layer, is 255*N/H. FIG. 7D illustrates a top view of the areas 1-5 of similar gray-value of the 3D model 704. As shown by the example 3D model 704 of FIGS. 7C, five (5) common depth values are found (illustrated by lines 1-5) and correspondingly illustrated in the pixel map of FIG. 7D as five (5) commonly shaded areas (1-5). That is, the vertical line 1 from the top of the center of the head down through the center of the 3D model 704 is one area, the vertical line 2 from the top of a side portion of the head down to the bottom of the head is another area, the vertical line 5 from the top of a shoulder portion of the 3D model down to the bottom of the shoulder portion is another area, the vertical line 3 from the top of a portion of the shoulder close to the neck down to the mid-section is another area and the vertical line 4 from the top of the shoulder portion but further from the neck to the bottom of the foot portion is the final area. Thus, in FIG. 7D, commonly shaded area 1 is representative of a top layer of a center portion of the head that has a depth as shown by line 1 in FIG. 7C. Common area 2 is representative of a top layer of a side portion 2 of the head as shown in FIG. 7D and has a depth as shown by line 2 in FIG. 7C. Common area 3 is centered around the part of the shoulder near the neck as shown in FIG. 7D and has a depth as shown by line 3 in FIG. 7C, etc.

The method 200 proceeds to step 214, where the method 200 creates a contour map of the 3D model from the pixel map. The step 214 performs binarization on the pixel map of FIG. 7D, that is, the pixels at the edges of the gray regions are assigned one of a binary value, such as black, and all other pixels are assigned another of a binary value, such as white, so as to get clear contours and regions. These clear contours and regions ensure that the pixel map clearly represents one or more suitable regions, that is, regions that are suitable for use for using a subtractive method for creating the utility hole in the 3D model. Thus, the differences between adjacent gray areas of the pixel map stored at step 212 are enhanced so that the edges of the gray areas become prominent. Such enhanced edges thereby define contours that outline regions of constant depth for the mesh as viewed from the top, which contours necessarily divide the 3D model into areas of common depth. FIG. 7E illustrates such contours which delineate areas 1-5. In order to identify contours (areas of similar available depth) in a layer. Whenever there is a voxel in a given contour that does not start at a max-z height of that contour (that is, the z height of the top layer of the contour), the method 200 calculates a z-difference value. If the z-difference value is greater than a predefined threshold, for example, the height of 3-4 voxels, a step value is added to the gray-value so as to enhance the difference in gray-value and thereby produce the gray-value edges shown in the eventual contour map of FIG. 7E. FIGS. 8A to 8E illustrate creating these gray-value edges that identify the contours. As shown by FIGS. 8A to 8C, by looking at a top view (FIG. 8B) of the 3D model (FIG. 8A), an incorrect pixel-map would be created since it would not show any edges (FIG. 8C). However, when using the voxelized model (FIG. 8D), and looking for z-height differences greater than, e.g., 4 voxels, such differences are used to define a gray-value edge, so that a pixel-map can be developed that correctly identifies depth contours, that is, by defining contour edges (FIG. 8E). Thus, this technique can effectively create a gray-value edge between adjacent top levels, such as the top of the head and the top of the shoulders for the voxel grid representation of the 3D model. The position of these edges is stored in a contour map (FIG. 7E described below), where the contours of the contour map are closed curves formed by joining together the position of the determined edges. The contour map is indexed by the z-coordinate which represents the depth at which the voxels of that contour occurred and are stored for later processing. Thus, the gray-value of each pixel of each x-y layer represents the available depth at that pixel, and edges of areas of uniform gray-values represent the contours that appear when the object is viewed from the z-axis.

The method 200 proceeds to step 216, where the method 200 adjusts the contour map of the 3D model to indicate if one or more areas of the contour map have a suitable depth (z) and area (x-y) for creating the utility hole. In some embodiments, suitability is determined by finding an x-y area in the contour map that is large enough to fit the x-y area of the utility hole and where that x-y area has a sufficiently high gray-value (i.e., an available depth greater than the depth of the utility hole). Thus, from this contour map created by step 214, the method 200 removes all pixels (turns them off) which have a gray-value below what is required to suitably form the utility hole, that is, where a depth value throughout a given x-y area required for the utility holes greater than or equal to the depth that is available in the contours. Returning to the example of FIG. 7, as shown in FIG. 7E, areas 2 and 5 are indicated to be unsuitable for utility hole creation, since their available depth is less than the user indicated is required for the utility hole. Additionally, areas 1 and 4 are also indicated to be unsuitable for utility hole creation, since their available x-y area is less than the area of polygon 703 of FIG. 7A (the minimum area required for creation of the utility hole. Thus, the highlighted box 714 of FIG. 7F representing the x-y bounds for creating the utility hole, is suitably created in the left edge of contour 3. FIG. 7G illustrates where the hole would be created in the 3D model 704.

The method 200 proceeds to step 218, where the method 200 determines a most suitable region in the top-layer of the 3D model which has a suitable area and depth thereunder for creation for the utility hole. Step 218 performs an iterative search of the contours stored in the contour map to determine if one, multiple or no suitable candidate regions are indicated by step 216.

In the present example, because in step 216 only one area (region 3) was indicated to have a suitable area and depth, step 218 causes the method 200 to proceed to step 220, described below, where a center of gravity check is performed to determine if the lone suitable region is in fact most suitable.

In the event that step 216 indicated multiple regions have suitable area and depth for utility hole creation, step 218 would use the method of step 220, described below, to decide a most suitable one region of the multiple suitable regions.

In the event that step 216 indicated no regions have suitable area and depth for utility hole creation, step 218 would attempt to determine a most suitable region, as described in further detail with respect to the method 300 below. If in step 218 (after performance of method 300) a suitable region of the 3D model in which to create the utility hole can still not be found, the method 200 advances to step 222 and ends, after which evaluation module 112 evaluates use of an additive method to make the utility hole, as described in further detail with respect to FIG. 4 below.

At step 220, where the method 200 computes the effect of the utility hole on the structural stability of the 3D model by computing the effect of the utility hole on the center of gravity for the 3D model. The degree of the effect on the center of gravity of the 3D model is used as a determining factor to choose between multiple regions that are found to be suitable for utility hole creation, or if only one region was found, to determine if that one region is in fact suitable. FIGS. 10A to 10E illustrate one exemplary algorithm for computation of the degree of the effect of the hole creation/utilization on the center of gravity of the 3D model. FIG. 10A illustrates a representative hole geometry 1000. FIG. 10B illustrates a 3D mesh model 1002 similar to 702 of FIG. 7A, having a polygon shape 1003 and axis of orientation 1005. FIG. 10C illustrates indication by step 218 of two suitable regions, one called "option 1" and one called 'option 2", each such region meeting the size and depth requirements for creation of the utility hole therein. The algorithm shown below by steps 1-6 basically determines a cervical medial spine as the center of gravity of the 3D model, that is, a line through the middle of the 3D model representative of its center of gravity as a function of depth (z). The distance of a candidate area from this line is used as a determining factor for choosing one of the candidate areas for placing the hole therein. If the distance of a point from the medial spine to the x-y center of one of the candidate areas is larger than the distance from the medial spine to the x-y center of another candidate area, then it is more likely that any weight placed in the candidate area having the larger distance will topple the model as compared with the candidate area having the smaller distance.

In one embodiment, a determination of the cervical medial-spine of a 3D model can be accomplished by the following algorithm, although any of several well-known algorithms can be used. The algorithm assumes point-masses at vertices of the 3D model and determines the centroid (center of mass) of the vertices at various depth levels of the model.

1: SpineLine={ }
2: Sort the vertices by their z-coordinates
3: Determine z-min and z-max
4: s=(z-max−z-min)/N where N>>0 (typically, N is proportional to number of vertices).
5. for z=z-min to z-max step s:
   5.1)(Avg=0, yAvg=0, count=0
   5.2 For each vertex v with z-coordinate in [z, z+s):
      5.2.1:)(Avg=xAvg+v.x
      5.2.2: yAvg=yAvg+v.y
      5.2.3: count=count+1
   5.3 [count>0]xAvg=xAvg/count, yAvg=yAvg/count.
   5.4 SpinePoints=SpinePoints U {(xAvg, yAvg, (2*z+s)/2)}
6. Regress over points in SpinePoints to determine the medial axis.

The effect of the above algorithm is illustrated in FIG. 10D, where if you start sweeping a (thick) horizontal plane 1010 down the z-axis of the 3D mesh model 1002, every time the plane 1010 hits/encloses a plurality of vertices, the algorithm determines the center of mass of those vertices. This process determines a number of centroids, one for each depth level as the horizontal plane 1010 sweeps down the z-axis of the 3D mesh model 1002. Step 6 fits a straight line through these points using regression, resulting in an approximation of the vertical spine that represents a medial axis about which torques will be applied by objects placed in the candidate region (suitable area).

More specifically, assuming uniform density for example, of a specified pen, card or cup, the step 220 computes the effect of the utility hole (and in some embodiments also the distributed weight of an object placed in the utility hole) on the center of gravity of the 3D model. This is done for each suitable area in order to determine which is most suitable. A most suitable area would be the one where the gravitational force on the 3D model when holding the specified object does not cause torque about the base of the 3D model that is strong enough to cause the 3D model to topple.

Thus, if step 218 determined multiple suitable areas, step 218 uses step 220 to determine the effect of the center of gravity of the 3D model when the utility hole including an object is placed in each of the determined suitable areas and selects as the most suitable region that suitable area that least affects the center of gravity. A threshold value of the effect on the center of gravity can be used to cause step 220 to determine that no area is most suitable, in which case an additive hole creation method may be evaluated, as described in greater detail below. Thereafter, the method 200 proceeds to step 222 and ends.

Figure 3:
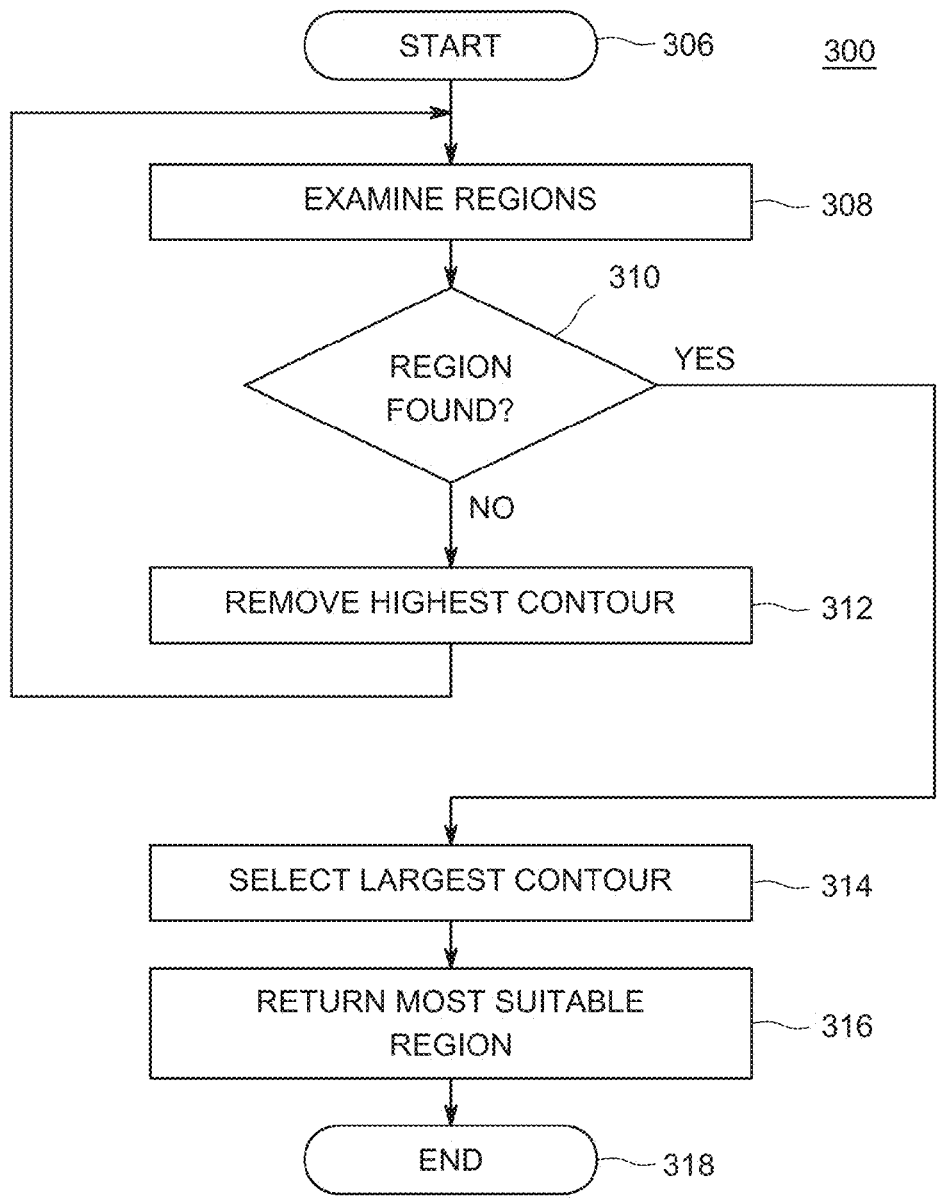
FIG. 3 depicts a flow diagram of a method for determining a most suitable region of the 3D model creating the utility hole using a subtractive method, as performed by the heuristic evaluation module of FIG. 1, according to one or more embodiments.

As noted above, in some embodiments step 216 may indicate no regions that have suitable area and depth for utility hole creation, in which case the method 300 would be used. Details of method 300 are now described in conjunction with FIG. 3. Method 300 is performed by the heuristic evaluation module 112 of FIG. 1, according to one or more embodiments. When step 216 of method 200 indicates no regions have suitable area and depth for utility hole creation, method 300 attempts to create a most suitable region for location of the utility hole. The method 300 starts at step 306 and proceeds to step 308.

At step 308 the method 300 examines regions in the bitmap image to find those that have equal or greater dimensions than the required width and height of the bounding box for the utility hole, that is, the regions indicated by step 216 of method 200.

The method 300 proceeds to step 310, where if one or more suitable candidate regions are found, their locations are input to step 314. Step 314 of the method 300 selects from the one or more suitable candidate regions, the region with the largest contour, that is, the contour enclosing the greatest area in the pixel map. The largest contour is the one that is associated with the most points in the contour map. For example, consider a 5×5 matrix as follows:

$$\begin{bmatrix} 1 & 1 & 1 & 0 & 0 \\ 1 & 1 & 1 & 0 & 0 \\ 1 & 1 & 1 & 0 & 0 \\ 1 & 1 & 1 & 2 & 2 \\ 1 & 1 & 1 & 2 & 2 \end{bmatrix}$$

Each point of the matrix indicates which contour it lies inside. Region "1" is indicated the most times in the above 5×5 matrix, thereby indicating that contour 1 has the highest number of entries and hence represents the largest contour region. The largest contour would typically the one most suitable for hole creation.

If step 310 determines that no such region is found, the method 300 proceeds to step 312, where the method 300 merges two or more unsuitable regions in an attempt to create a suitable region. This is accomplished by iteratively removing the contour enclosing the largest volume from the contour map (by converting its pixels to white). Although in general it is undesirable to remove contours to create a volume sufficient for utility hole creation, if no such sufficient volume was found by step 308, this heuristic technique is the next best solution to find a candidate region having a volume sufficient to fit the geometry of the utility hole. Because every contour represents a level of detail in the 3D model, removal of a contour, as noted above, is undesirable. Thus, in order to limit loss (destruction) of detail with each contour removal, step 312 associates a measure of smoothness to each contour before considering its removal. In one embodiment, this measure of smoothness is the number of inflection points on the contour (number of times the curvature changes sign) divided by the length of the contour. The rational of this heuristic is that the greater the number of inflection points per unit length, the greater is the detail that this contour would represent. Thus, determination of this measure of contour smoothness can be used, in some embodiments, as an additional criterion for selection of which contour to remove in step 312, such that smoother contours would be removed before less smooth contours (contours having more detail) are removed.

The method 300 then proceeds to step 308 and iterates until at step 310, the method 300 finds one or more suitable regions, at which time the method 300 proceeds to step 314.

At step 314, the method 300 selects, from the one or more regions, the region with the largest contour in the pixel map.

The method 300 proceeds to step 316, where the method 300 returns the largest contour found by step 314 as the most suitable region for the utility hole. This largest region, after the iteration of steps 308 to 312, if needed, is deemed the most suitable region in that it affects the least detail in the 3D model when creating the utility hole.

Thus, the rationale for the above steps is as follows—each contour represents a surface that will have to be destroyed (thereby distorting the appearance of the 3D model) so as to accommodate the utility hole. First, the method 300 tries to find a hole without destroying any of the external surfaces, i.e., contours. But if that fails, the method 300 allows for destruction of one contour (corresponding to one external surface of the 3D model) and repeats the search. This iterates until a threshold number (percentage) of contours get destroyed, beyond which it would be prudent to report that no suitable position can be found, and, in some embodiments, an additive hole creation method should be evaluated. In some embodiments, the threshold is based on tracking the height associated with the contours that get destroyed and aborting as soon as the height of the destroyed contour is greater than the height of the utility hole geometry. In other embodiments, the method 300 restricts the contour height to half of the height of the 3D model for which the utility hole is being added (which height is available from the user input).

The method 300 proceeds to step 318 and ends.

Figure 4:
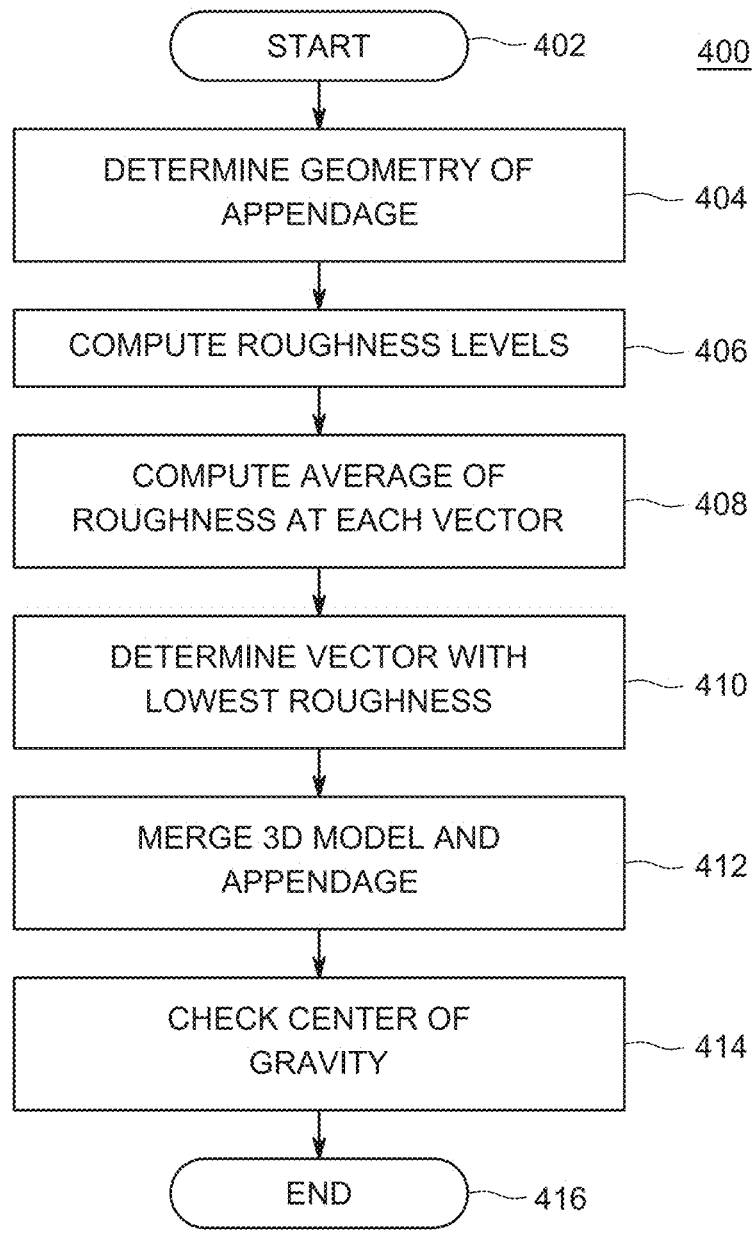
FIG. 4 depicts a flow diagram of an additive method for automatically adding utility holes as an appendage attachment to printable 3D models as performed by the heuristic evaluation module of FIG. 1, according to one or more embodiments.

FIG. 4 is a flow diagram of an additive method 400 for automatically adding utility holes as an appendage attachment to printable 3D models, as performed by the heuristic evaluation module 112 of FIG. 1, according to one or more embodiments. The method 400 is used if the additive method is specified by the user, or if method 200 (step 218 or its detail, method 300) was not able to return a suitable location for the utility hole creation using the subtractive method. The method 400 determines a suitable geometry and location for the appendage that includes the utility hole. FIGS. 9A to 9G illustrate various steps of method 400.

The method 400 starts at step 402 and proceeds to step 404. At step 404, the method 400 determines a geometry for an appendage. The method 400 uses the outer geometry of the object to be held. The method 400 assumes the holder to be a single closed manifold, such as 902 of FIG. 9A. As such, the outer geometry of the appendage can be abstracted as a cuboidal bounding box having its longitudinal axis positioned to be parallel to the longitudinal axis of the 3D model 904, and placed at a certain height 906 from a ground level 908 (0 z-level for the 3D model 900 shown in FIG. 9A.

The problem then is to identify a suitable surface position of the 3D model to which the appendage should be attached. The actual attachment is a simple union of the mesh representation of the model 900 and the appendage 902, but the position at which they are attached is important to be suitably identified so as to preserve model aesthetics.

The method 400 assumes that the height from the ground level is fixed so that the search space for a position for attachment is minimized. The method 400 can be extended to determine if the provided fixed height is not optimum for the given 3D model. In that case, an additional support bridge of delta height (i.e., the difference between optimum height and specified fixed height) can be added to the appendage attachment. The method 400 also assumes that the attachment is made in one of a few fixed directions (such as one of eight directional vectors), but this assumption can be relaxed later after an approximate attachment position is computed.

The method 400 proceeds to step 406, where the method 400 computes a roughness level of the 3D model in each of eight vector directions. The level of roughness is a measure of the density of detail in the 3D model, and hence, an indication of aesthetic characteristics that should not be disturbed. FIG. 9C illustrates the model smoothened using Laplacian smoothing, which is a standard technique used for roughness measurement and micro-level smoothing of a surface. Laplacian roughness of a 3D surface is the equivalent of edge-finding in a 2D image. The strength of the discrete Laplacian at a vertex represents the level of edginess/roughness at the vertex. FIG. 9D shows the Laplacian roughness calculation in a simplified manner (that is, along a single vector direction of eight possible directions). The method 400 computes the level of roughness by computing the envelope of the vertices hitting a plane normal of each of the direction vectors of the model representation. These vertices are first processed using a smoothing algorithm, for example, Geometric Laplacian smoothing, or other algorithm, that removes a micro-level roughness of the surface, as shown by FIG. 9C.

The method 400 proceeds to step 408, where the method 400 computes a second level roughness (again using Geometric Laplacian smoothing, or another algorithm), and this time uses a weighted average of roughness values at every vertex, such as the set of vectors for a given vertex as shown on a portion of FIG. 9D. The weighting is based on the distance from each vertex to a projection plane, as illustrated by FIG. 9E. This roughness value indicates the number of "visible" features/details when looking at the 3D model from the direction of the vector under consideration.

The method 400 proceeds to step 410, where the method 400 determines the direction of the vector with the lowest roughness value (and hence lowest amount of aesthetic detail), and outputs that vector as the most suitable direction in which the appendage should be attached.

The method 400 proceeds to step 412, where the method 400 merges the 3D model and the appendage. To perform the merge, the method 400 first computes the convex hull of each of the appendage and model geometry and then a Boolean union of the geometries performs the merge, as shown in FIG. 9F. Hull computation and Boolean union are both standard geometric techniques for combining 3D models. Hull computation is necessary to ensure that the hole geometry just overlaps with the geometry of the 3D model and is a pre-requisite for doing a constructive solid geometry operation like a Boolean union. The method 400 merges those hulls along the selected most suitable vector. The method 400 accomplishes the merge by rotating the geometry of the appendage so as to align the appendage along the selected vector, and then translating the aligned appendage until the convex hulls of the appendage and model are in collision. The resulting 3D model is shown in FIG. 9G.

The method 400 proceeds to step 414, where the method 400 checks the center of gravity of the 3D model having the merged geometry and adjusts the utility hole if needed. The method 400 computes the center of gravity of the 3D model to ensure that the gravitational force on the 3D model when holding the external object does not cause torque about the base that is strong enough to topple the combined model plus object. Such computation was described above in relation to step 222 in method 200, and there is not repeated here. Thereafter, method 400 proceeds to step 416 and ends.

These methods 200 and 400 can be employed by a 3D printing service on the cloud (provided by a software provider such as ADOBE® Systems, Incorporated,) for quick personalization of 3D models for printing by users, without any requirement that the user have specific image/model processing skills. The methods can also be used as a feature in 3D printing plans, such as PHOTOSHOP, ACROBAT, and the like. The methods can also be included in desktop software applications for 3D printing, as well as included in the firmware of high-end 3D printers. Using these methods any shape can quickly and easily be augmented by an unskilled user to be an object holder, such as a pen-holder, an envelope holder, or a photo-frame, for example.

Figure 5A:
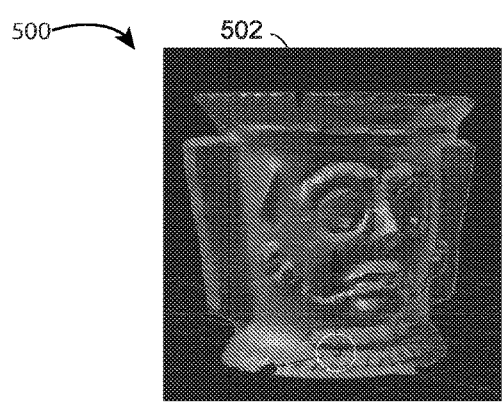
FIGS. 5A and 5B illustrate the addition of a utility hole to a 3D model using a subtractive method, according to one or more embodiments.
Figure 5B:
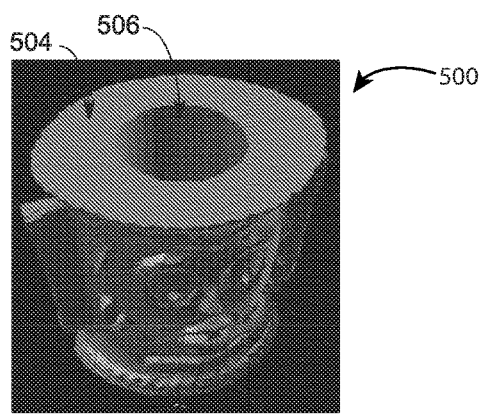

FIGS. 5A and 5B illustrate the addition of a utility hole to a 3D model 500 using a subtractive method, according to one or more embodiments. FIG. 5A illustrates a frontal view 502 of a 3D model 500. FIG. 5B illustrates a perspective view 504, wherein the 3D model 500 includes a utility hole 506 that has been created using a subtractive method.

Figure 6A:
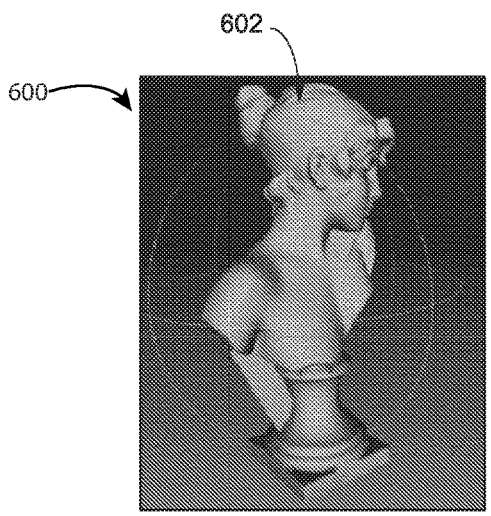
FIGS. 6A and 6B illustrate the addition of a utility hole to a 3D module using an additive method, according to one or more embodiments.
Figure 6B:
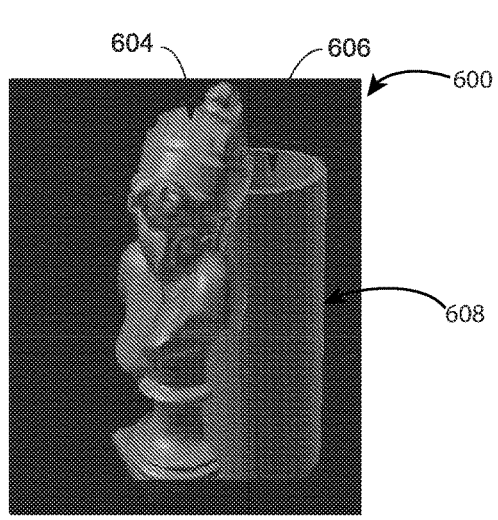

FIGS. 6A and 6B illustrate the addition of a utility hole to a 3D model 600 using an additive method, according to one or more embodiments. FIG. 6A illustrates a frontal view 602 of a 3D model 600. FIG. 6B illustrates a perspective view 604 of the 3D model 600. A utility hole 606 has been created by addition to the 3D model 600 by the addition of an appendage 608 using an additive method. A utility hole 606 is created in appendage 608.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
    accessing a digital representation of a 3D model;
    accessing specifications that define a geometry of a utility hole to be included as part of the 3D model;
    identifying, by at least one processor, a plurality of possible placements on the 3D model for including the utility hole as part of the 3D model;
    determining, by the at least one processor for each possible placement from the plurality of possible placements, a center of gravity for the 3D model with the utility hole as part of the 3D model at the possible placement;
    performing, by the at least one processor, a heuristic evaluation of a structure of the 3D model using the digital representation of the 3D model to determine, based on the determined center of gravity for each possible placement, a placement from the plurality of possible placements on the 3D model for the utility hole to be included as part of the 3D model;
    generating, by the at least one processor, a modified digital representation of the 3D model that includes the utility hole at the determined placement on the 3D model; and
    providing a modified digital representation of the 3D model for printing.

2. The method of claim 1, wherein accessing specifications that define the geometry of the utility hole comprises accessing a shape for the utility hole and an orientation axis for the utility hole.

3. The method of claim 1, wherein performing the heuristic evaluation comprises finding a placement for the utility hole that minimizes disturbance of surface details of the 3D model.

4. The method of claim 3, wherein identifying the plurality of possible placements comprises dividing a top portion of the 3D model into a 2-dimensional layer, and dividing that 2-dimensional layer into regions of constant depth into the 3D model.

5. The method of claim 4, wherein identifying the plurality of possible placements comprises rotating the 3D model so that the 2-dimensional layer is perpendicular to the orientation axis for the utility hole.

6. The method of claim 4, wherein identifying the plurality of possible placements comprises finding regions in the 2-dimensional layer that can suitably accommodate the geometry of the utility hole.

7. The method of claim 1, wherein identifying the plurality of possible placements comprises:
    initially evaluating using a subtractive method on the 3D model for creating the utility hole in the 3D model, the subtractive method comprising removing a portion of the 3D model based on the geometry of the utility hole; and
    if the evaluation finds the subtractive method not suitable, evaluating an additive method on the 3D model for creating an appendage to the 3D model and identifying one or more possible placements of the utility hole in the appendage.

8. The method of claim 1, wherein performing the heuristic evaluation to determine the placement further comprises:
    determining the possible placement that least affects the determined center of gravity; and
    selecting the possible placement that least affects the determined center of gravity as the placement.

9. The method of claim 1, wherein performing the heuristic evaluation to determine the placement is determined by heuristics that attempt to minimize the effect of the utility hole on aesthetics of the 3D model.

10. The method of claim 1, wherein performing the heuristic evaluation to determine the placement is determined by heuristics that attempt to minimize the effect of the utility hole on structural stability of the 3D model.

11. An apparatus for automatically adding a utility hole to a printable 3-dimensional model, comprising:
    at least one processor; and
    a non-transitory computer readable storage medium comprising instructions that, when executed by the at least one processor, cause the apparatus to:
    identify a plurality of possible placements on a 3D model for including a utility hole as part of the 3D model;
    determine, for each possible placement from the plurality of possible placements, a center of gravity for the 3D model with the utility hole as part of the 3D model at the possible placement;
    heuristically evaluate a structure of the 3D model using a digital representation of the 3D model to determine, based on the determined center of gravity for each possible placement, a placement from the plurality of possible placements on the 3D model for the utility hole to be included as part of the 3D model;

generate a modified digital representation of the 3D model including the utility hole at the determined placement on the 3D model; and provide the modified digital representation of the 3D model for printing.

12. The apparatus of claim 11, further comprising instructions that, when executed by the at least one processor, cause the apparatus to:

find a placement for the utility hole that minimizes disturbance of surface details of the 3D model;

divide a top portion of the 3D model into a 2-dimensional layer, and dividing that 2-dimensional layer into regions of constant depth into the 3D model;

rotate the 3D model so that the 2-dimensional layer is perpendicular to the orientation axis for the utility hole; and find regions in the 2-dimensional layer that can suitably accommodate the geometry of the utility hole.

13. The apparatus of claim 11, further comprising instructions that, when executed by the at least one processor, cause the apparatus to:

initially evaluate using a subtractive method on the 3D model for creating the utility hole in the 3D model to determine a suitable placement for the utility hole, the subtractive method comprising removing a portion of the 3D model based on the geometry of the utility hole; and if the evaluation finds the subtractive method not suitable, evaluating an additive method on the 3D model for creating an appendage to the 3D model and identifying one or more possible placements of the utility hole in the appendage.

14. The apparatus of 11, further comprising instructions that, when executed by the at least one processor, cause the apparatus to heuristically evaluate the structure of the 3D model to determine the placement by minimizing the effect of the utility hole on (i) the outside surfaces of the 3D model, (ii) the aesthetics of the 3D model, and (iii) the structural stability of the 3D model.

15. A non-transitory computer readable medium for storing computer instructions that, when executed by at least one processor causes the at least one processor to automatically add utility holes to printable 3D models by performing steps comprising:

accessing a digital representation of a 3D model;

accessing parameters that define a geometry of a utility hole to be included with the 3D model;

identifying a plurality of possible placements on the 3D model for including the utility hole as part of the 3D model;

determining, for each possible placement from the plurality of possible placements, a center of gravity for the 3D model with the utility hole as part of the 3D model at the possible placement;

performing a heuristic evaluation of a structure of the 3D model using the digital representation of the 3D model to determine, based on the determined center of gravity for each possible placement, a placement from the plurality of possible placements on the 3D model for the utility hole to be included as part of the 3D model;

generating a modified digital representation of the 3D model that includes the utility hole at the determined placement on the 3D model; and providing the modified digital representation of the 3D model for printing.

16. The computer readable medium of claim 15, further comprising instructions that, when executed by at least one processor, cause the at least one processor to perform the heuristic evaluation by finding a placement for the hole that minimizes disturbance of surface details of the 3D model.

17. The computer readable medium of claim 15, further comprising instructions that, when executed by at least one processor, cause the at least one processor to identify the plurality of possible placements by dividing top portion of the 3D model into a 2D layer, and dividing that 2D layer into regions of constant depth into the 3D model.

18. The computer readable medium of claim 17, further comprising instructions that, when executed by at least one processor, cause the at least one processor to identify the plurality of possible placements by rotating the 3D model so that the 2D layer is perpendicular to the orientation axis for the utility hole, and then finding regions in the 2D layer that can suitably accommodate the geometry of the utility hole.

19. The computer readable medium of claim 15, further comprising instructions that, when executed by at least one processor, cause the at least one processor to:

initially evaluate using a subtractive method on the 3D model for creating the utility hole in the 3D model, the subtractive method comprising removing a portion of the 3D model based on the geometry of the utility hole; and if the evaluation finds the subtractive method not suitable, evaluate an additive method on the 3D model for creating an appendage to the 3D model and identifying a possible placement of the utility hole in the appendage.

20. The computer readable medium of claim 15, further comprising instructions that, when executed by at least one processor, cause the at least one processor to perform the heuristic evaluation of the 3D model to determine the placement by minimizing the effect of the utility hole on (i) the surface details of the 3D model, (ii) the aesthetics of the 3D model, and (iii) the structural stability of the 3D model.

* * * * *